US006250451B1

(12) United States Patent
Thirkill

(10) Patent No.: US 6,250,451 B1
(45) Date of Patent: Jun. 26, 2001

(54) SHOPPING CART RENTAL SYSTEM

(76) Inventor: Andre' Thirkill, 1100 Rodeo Dr. #739, Imperial, CA (US) 92251

( * ) Notice: Subject to any disclaimer, the term of this patent is extended or adjusted under 35 U.S.C. 154(b) by 0 days.

(21) Appl. No.: 09/528,269

(22) Filed: Mar. 17, 2000

(51) Int. Cl.[7] ................................ G07F 7/00; G07F 1/00; B62D 39/00

(52) U.S. Cl. .......................... 194/205; 194/343; 194/351; 194/905; 280/33.992

(58) Field of Search ..................................... 194/343, 351, 194/905, 205, 212; 280/33.992, 33.994

(56) References Cited

U.S. PATENT DOCUMENTS 4,691,816 * 9/1987 Trubiano .............................. 194/212
5,069,324 * 12/1991 Lepage et al. ....................... 194/212
5,180,045 * 1/1993 Sonnendorfer et al. ............. 194/212
5,899,312 * 5/1999 Wild ..................................... 194/203
6,065,764 * 5/2000 Moseley .......................... 280/33.992

* cited by examiner

*Primary Examiner*—Robert P. Olszewski
*Assistant Examiner*—Bryan Jaketic

(57) ABSTRACT

A shopping cart rental system for renting shopping carts and encouraging returning of shopping carts to designated areas. The shopping cart rental system includes a plurality of rental assemblies. Each of the rental assemblies comprises a housing. The housing comprises an upper portion. A lower portion is couplable to the upper portion. A plurality of coin slots are located on a front face of the upper portion. A key slot is formed through a rear face of said upper portion. A key is for inserting into the key slot. The key is coupled to the upper portion of the housing. A key retaining assembly is for retaining the key in the key slot. A coin operated assembly for actuating the key retaining assembly. The coin operated assembly is operationally coupled between the coin slot and the key slot.

9 Claims, 5 Drawing Sheets

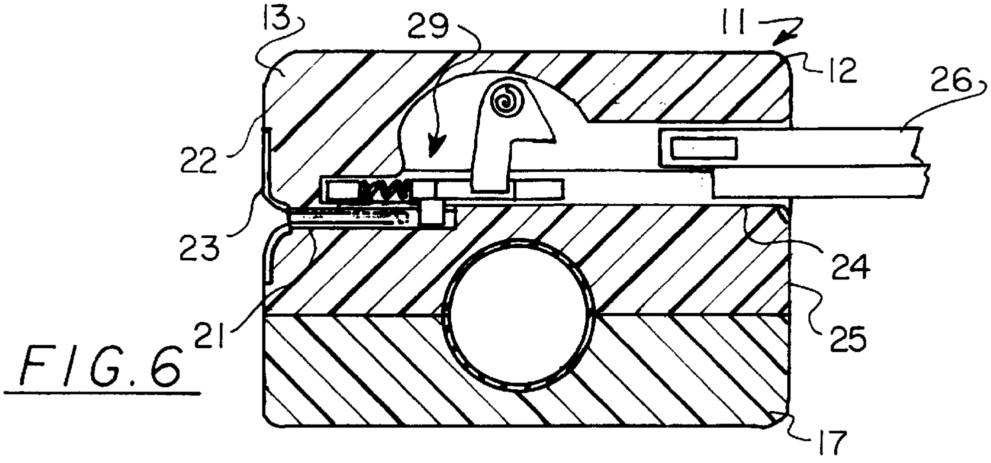
FIG. 6
FIG. 7
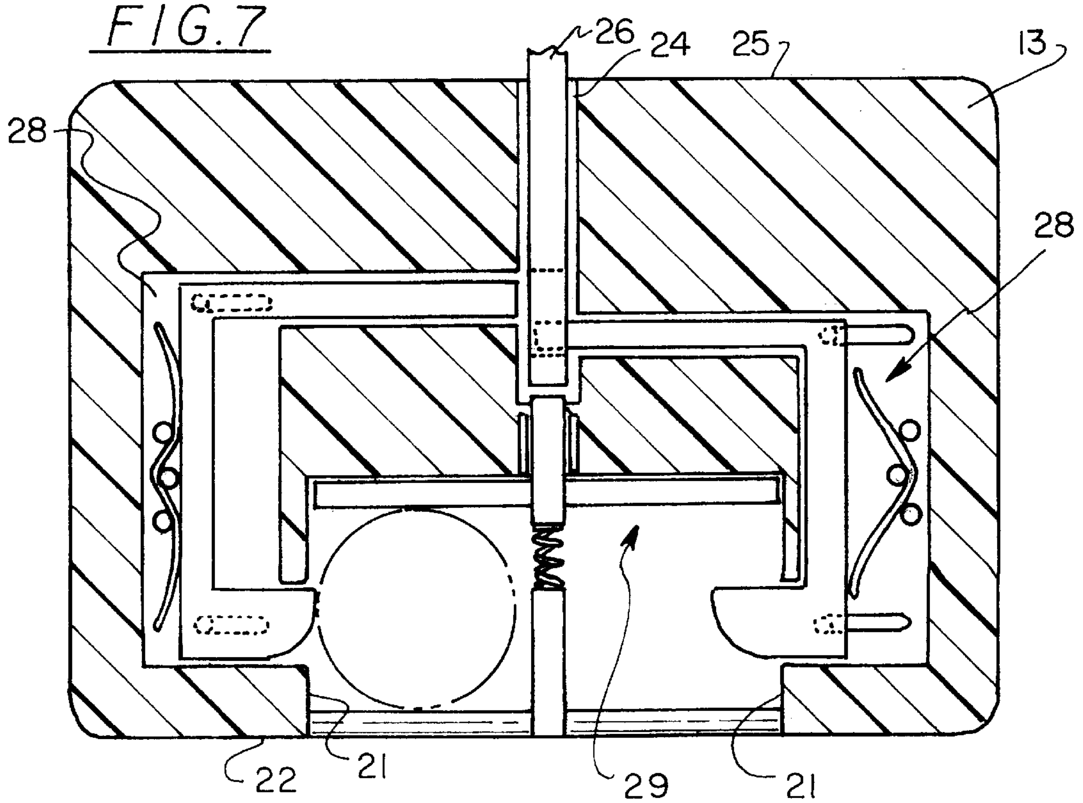

SHOPPING CART RENTAL SYSTEM

BACKGROUND OF THE INVENTION

1. Field of the Invention

The present invention relates to locking devices for shopping carts and more particularly pertains to a new shopping cart rental system for renting shopping carts and encouraging returning of shopping carts to designated areas.

2. Description of the Prior Art

The use of locking devices for shopping carts is known in the prior art. More specifically, locking devices for shopping carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,897,863; U.S. Pat. No. 4,424,893; U.S. Pat. No. 5,069,325; U.S. Pat. No. 4,691,816; U.S. Pat. No. 4,637,507; and U.S. Pat. No. 4,766,989.

While these devices fulfill their respective, particular objectives and requirements, the aforementioned patents do not disclose a new shopping cart rental system. The inventive device includes a plurality of rental assemblies. Each of the rental assemblies comprises a housing for attaching to the handle of the shopping cart. The housing comprises an upper portion adapted for orientating above the handle of the shopping cart. A lower portion is couplable to the upper portion for orientating below the handle of the shopping cart. A plurality of coin slots are located on a front face of the upper portion. The coin slots are adapted for receiving coins for renting the shopping cart. A key slot is formed through a rear face of said upper portion. A key is for inserting into the key slot. The key is coupled to the upper portion of the housing. A key retaining means is for retaining the key in the key slot. A coin operated means for actuating the key retaining means. The coin operated means is operationally coupled between the coin slot and the key slot. The key from a first rental assembly is insertable in the key slot of a second rental assembly such that the first rental assembly is locked to the second assembly. The coin operated means of the second rental assembly is adapted to actuate the key retaining means of the second rental assembly to release the key of the first rental assembly. The key retaining means of the second rental means is adapted to actuate the coin operated means of the second rental assembly upon insertion of the key of the first rental assembly into the key slot of the second rental assembly.

In these respects, the shopping cart rental system according to the present invention substantially departs from the conventional concepts and designs of the prior art, and in so doing provides an apparatus primarily developed for the purpose of renting shopping carts and encouraging returning of shopping carts to designated areas.

SUMMARY OF THE INVENTION

In view of the foregoing disadvantages inherent in the known types of locking devices for shopping carts now present in the prior art, the present invention provides a new shopping cart rental system construction wherein the same can be utilized for renting shopping carts and encouraging returning of shopping carts to designated areas.

The general purpose of the present invention, which will be described subsequently in greater detail, is to provide a new shopping cart rental system apparatus and method which has many of the advantages of the locking devices for shopping carts mentioned heretofore and many novel features that result in a new shopping cart rental system which is not anticipated, rendered obvious, suggested, or even implied by any of the prior art locking devices for shopping carts, either alone or in any combination thereof.

To attain this, the present invention generally comprises a plurality of rental assemblies. Each of the rental assemblies comprises a housing for attaching to the handle of the shopping cart. The housing comprises an upper portion adapted for orientating above the handle of the shopping cart. A lower portion is couplable to the upper portion for orientating below the handle of the shopping cart. A plurality of coin slots are located on a front face of the upper portion. The coin slots are adapted for receiving coins for renting the shopping cart. A key slot is formed through a rear face of said upper portion. A key is for inserting into the key slot. The key is coupled to the upper portion of the housing. A key retaining means is for retaining the key in the key slot. A coin operated means for actuating the key retaining means. The coin operated means is operationally coupled between the coin slot and the key slot. The key from a first rental assembly is insertable in the key slot of a second rental assembly such that the first rental assembly is locked to the second assembly. The coin operated means of the second rental assembly is adapted to actuate the key retaining means of the second rental assembly to release the key of the first rental assembly. The key retaining means of the second rental means is adapted to actuate the coin operated means of the second rental assembly upon insertion of the key of the first rental assembly into the key slot of the second rental assembly .

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shopping cart rental system apparatus and method which has many of the advantages of the locking devices for shopping carts mentioned heretofore and many novel features that result in a new shopping cart rental system which is not anticipated, rendered obvious, suggested, or even implied by any of the prior art locking devices for shopping carts, either alone or in any combination thereof.

It is another object of the present invention to provide a new shopping cart rental system which may be easily and efficiently manufactured and marketed.

It is a further object of the present invention to provide a new shopping cart rental system which is of a durable and reliable construction.

An even further object of the present invention is to provide a new shopping cart rental system which is susceptible of a low cost of manufacture with regard to both materials and labor, and which accordingly is then susceptible of low prices of sale to the consuming public, thereby making such shopping cart rental system economically available to the buying public.

Still yet another object of the present invention is to provide a new shopping cart rental system which provides in the apparatuses and methods of the prior art some of the advantages thereof, while simultaneously overcoming some of the disadvantages normally associated therewith.

Still another object of the present invention is to provide a new shopping cart rental system for renting shopping carts and encouraging returning of shopping carts to designated areas.

Yet another object of the present invention is to provide a new shopping cart rental system which includes a plurality of rental assemblies. Each of the rental assemblies comprises a housing for attaching to the handle of the shopping cart. The housing comprises an upper portion adapted for orientating above the handle of the shopping cart. A lower portion is couplable to the upper portion for orientating below the handle of the shopping cart. A plurality of coin slots are located on a front face of the upper portion. The coin slots are adapted for receiving coins for renting the shopping cart. A key slot is formed through a rear face of said upper portion. A key is for inserting into the key slot. The key is coupled to the upper portion of the housing. A key retaining means is for retaining the key in the key slot. A coin operated means for actuating the key retaining means. The coin operated means is operationally coupled between the coin slot and the key slot. The key from a first rental assembly is insertable in the key slot of a second rental assembly such that the first rental assembly is locked to the second assembly. The coin operated means of the second rental assembly is adapted to actuate the key retaining means of the second rental assembly to release the key of the first rental assembly. The key retaining means of the second rental means is adapted to actuate the coin operated means of the second rental assembly upon insertion of the key of the first rental assembly into the key slot of the second rental assembly.

Still yet another object of the present invention is to provide a new shopping cart rental system that provides the owner a means for recovering cost of repair of carts damaged by users who fail to return carts to designated areas.

Even still another object of the present invention is to provide a new shopping cart rental system that prevents carts from being left in undesignated areas and damaging cars that collide with the carts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a cross-sectional view of the present invention.

FIG. 7 is a cross sectional view of the present invention.

DESCRIPTION OF THE PREFERRED EMBODIMENT

Figure 1:
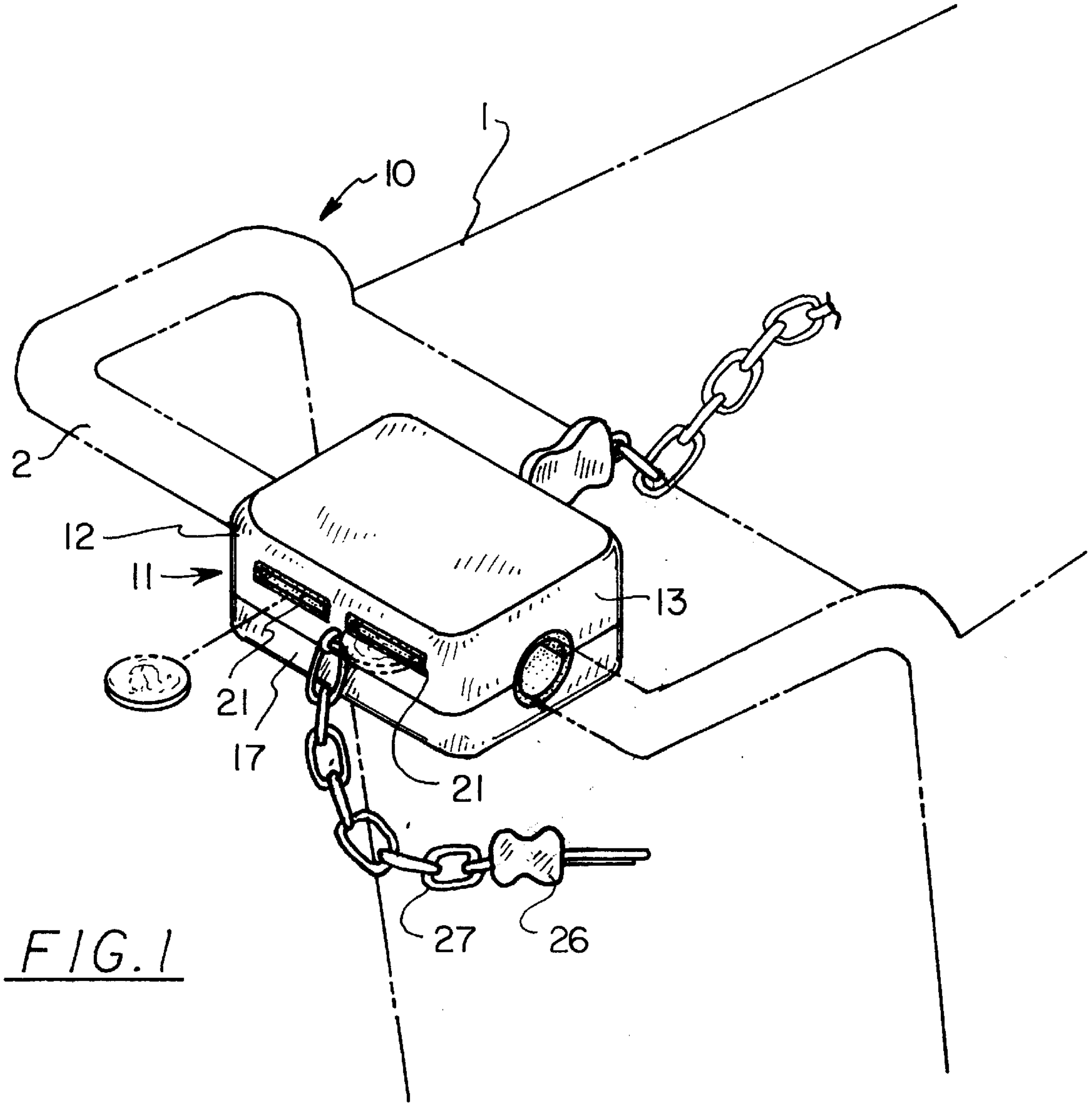
FIG. 1 is a front perspective view of a new shopping cart rental system according to the present invention.
Figure 2:
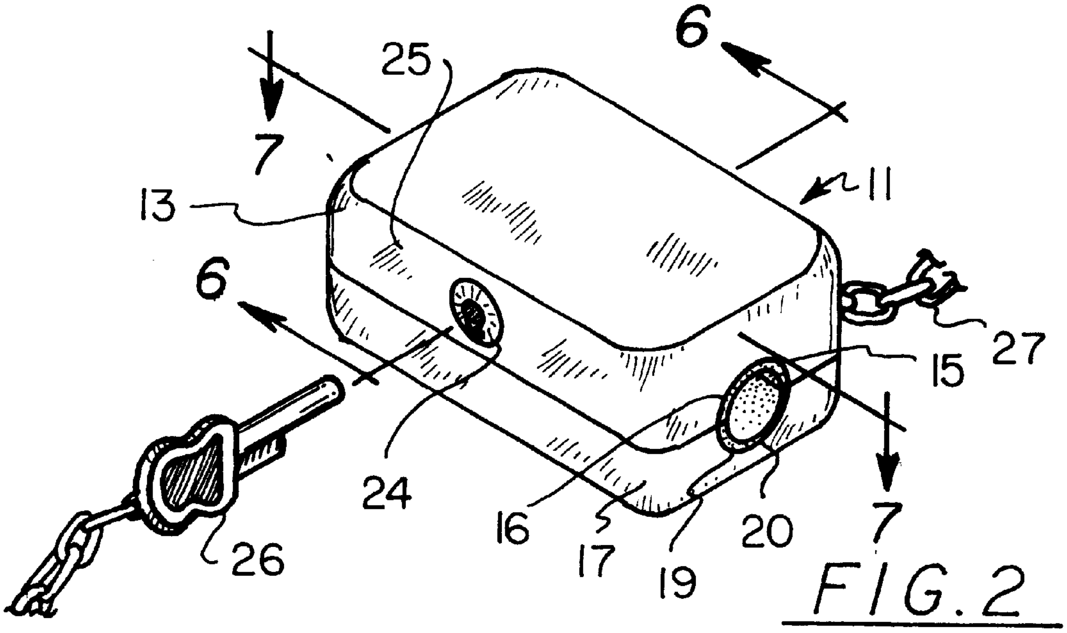
FIG. 2 is a rear perspective view of the present invention.
Figure 3:
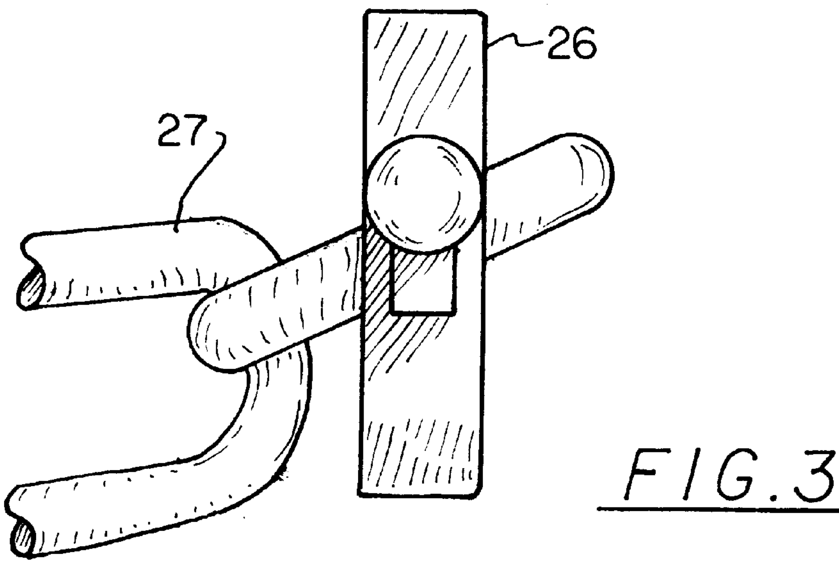
FIG. 3 is an elevational view of the key of the present invention.
Figure 4:
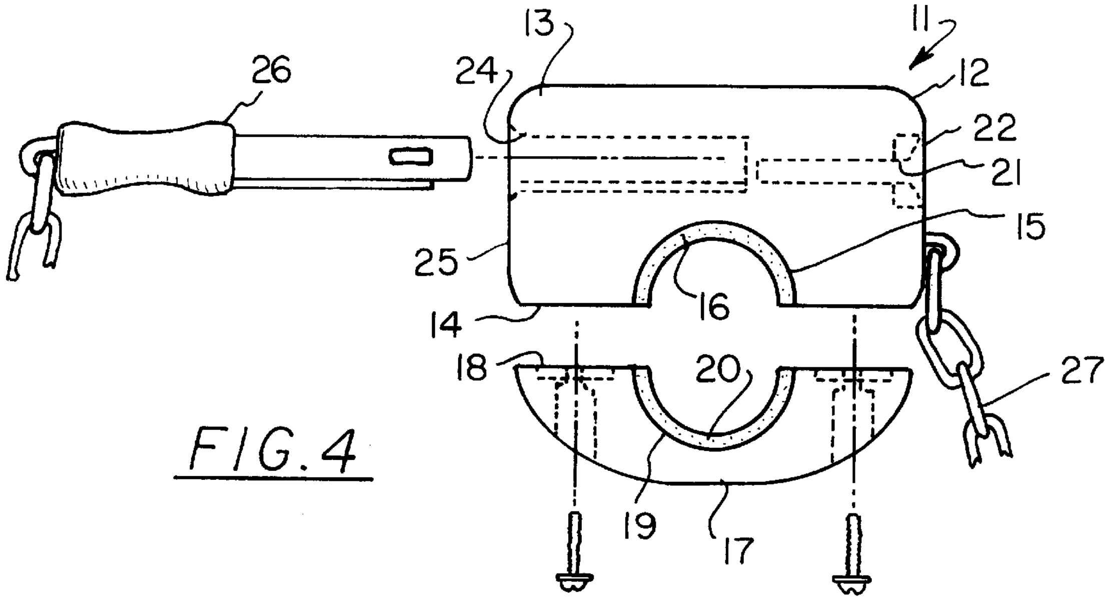
FIG. 4 is an exploded elevational view of the present invention.
Figure 5:
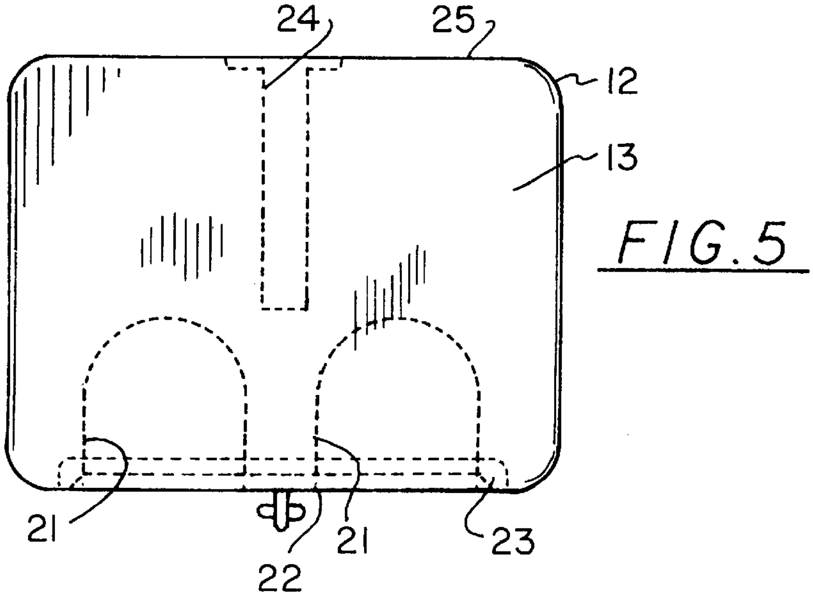
FIG. 5 is a top plan view of the present invention.
Figure 8:
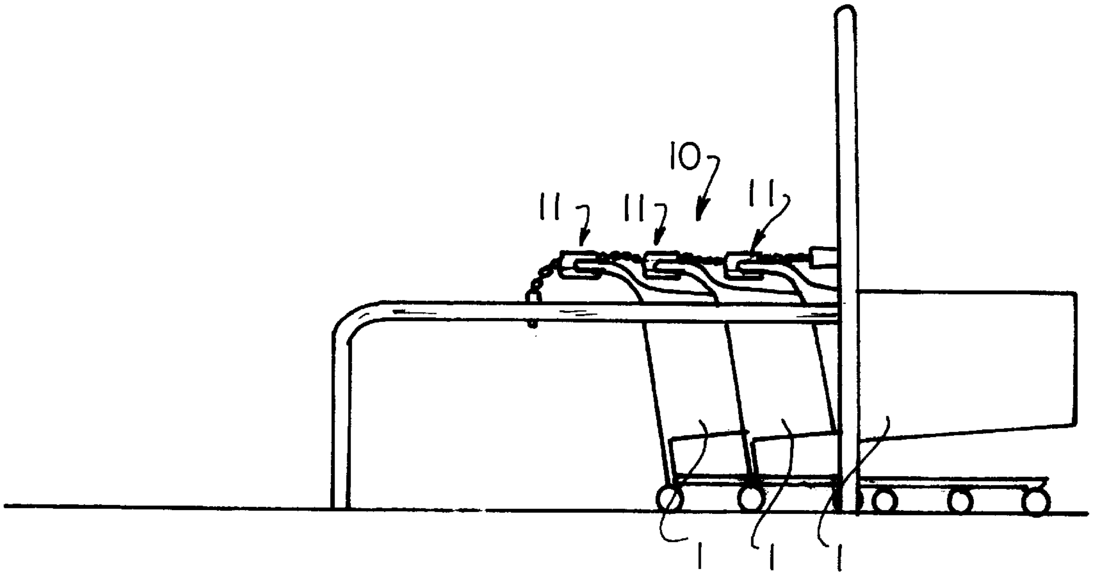
FIG. 8 is an elevational view of a plurality of rental assemblies of the present invention in use.

With reference now to the drawings, and in particular to FIGS. 1 through 8 thereof, a new shopping cart rental system embodying the principles and concepts of the present invention and generally designated by the reference numeral 10 will be described.

As best illustrated in FIGS. 1 through 8, the shopping cart rental system 10 generally comprises a plurality of rental assemblies 11. Each of the rental assemblies comprise a housing 12 for attaching to the handle 2 of the shopping cart 1.

As shown in FIG. 1, the housing comprises an upper portion 13 adapted for orientating above the handle of the shopping cart. The upper portion comprises a bottom face 14. The bottom face comprises an arcuate channel 15 adapted for receiving a portion of the handle of the shopping cart. The arcuate channel of the upper portion has an elastomeric layer 16 for resisting rotation of the upper portion around the handle of the shopping cart. The housing has a length of about 3 and ½ inches, a width of about 2 and ⅝ inches and a height of about 2 inches. The upper portion has a height of about 1 and 5/16 inches.

A lower portion 17 is couplable to the upper portion for orientating below the handle of the shopping cart. The lower portion has a top face 18. The top face comprises an arcuate channel 19 adapted for receiving a portion of the handle of a shopping cart. The arcuate channel of the lower portion has an elastomeric layer 20 for resisting rotation of the lower portion around the handle of the shopping cart. The lower portion having a height of about 11/16 of an inch.

A plurality of coin slots 21 are located on a front face 22 of the upper portion. The coin slots are adapted for receiving coins for renting the shopping cart. Each of the coin slots comprise an elastomeric liner 23 for preventing unauthorized removal of the coins from the coins slots. A top of the coin slots being located approximately 3/8 of an inch from the top of the upper portion.

As shown in FIGS. 4 through 7, a key slot 24 is formed through a rear face 25 of the upper portion. The key slot is positioned approximately 1/4 of an inch from the top of the upper portion. A key 26 is for inserting into the key slot. The key is coupled to the upper portion. The key is coupled to the front face of the upper portion by a chain 27. The chain comprises a length for preventing the key of one of the rental assemblies from being inserted into the key slot of same the rental assembly. A key retaining means 28 is for retaining the key in the key slot.

As shown in FIGS. 6 and 7, a coin operated means 29 is for actuating the key retaining means. The coin operated means is operationally coupled between the coin slot and the key retaining means. The key from a first rental assembly is insertable in the key slot of a second rental assembly such that the first rental assembly is locked to the second rental assembly. The coin operated means of the second rental assembly is adapted to actuate the key retaining means of the second rental assembly to release the key of the first rental assembly. The key retaining means of the second rental means is adapted to actuate the coin operated means of the second rental assembly upon insertion of the key of the first rental assembly into the key slot of the second rental assembly.

The key retaining means has a pair of generally U-shaped members that are operationally coupled between the coin slot and the key slot. Each of the members has a key engaging arm and a coin engaging arm such that when a coin is inserted into the coin slot the coin pushes against the coin engaging arm and causes the member to slide away from the coin. The key engaging arm slides back with the member thus removing the key engaging arm from a retaining hole formed in the key. When coins are in both coin slots the key retaining arms are removed from the retaining hole and the key is free to be removed. The coin operated mean comprises of a bar that spans a length of the coin slots and has a key striker that is orthogonally coupled to the bar. When coins are inserted into the coins slots the coins apply pressure to the bar and aid in removal of the key from the key slot. As the key is inserted into the key slot the key presses against the key striker which moves the bar and forces the coins out of the coin slots.

In use, a user would go to a cart corral and place the proper amount for a cart rental into the coin slots of the rental assemblies. The key would then be removed from the back of the housing and cart would then be free to be used by the user. Upon returning the cart to the cart corral the user would place the key from the second rental assembly into the key slot of the first rental assembly. The insertion of the key into the key slot would then force the coins back out of the coin slots such that a user could withdraw the coins and locking the key to the housing thereby preventing removal of the cart without the insertion of the coins into the coin slots.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shopping cart rental system for attaching to handles of shopping carts so as to provide a receptacle for coins received for rental of the cart, the cart rental system comprising:

a plurality of rental assemblies, each of said rental assemblies comprising:

a housing for attaching to the handle of the shopping cart, said housing having an upper portion adapted for orientating above the handle of the shopping cart;

a lower portion being couplable to said upper portion for orientating below the handle of the shopping cart;

a plurality of coin slots being located on said upper portion, said coin slots being adapted for receiving coins for renting the shopping cart;

a key slot being formed in said upper portion;

a key being for inserting into said key slot, said key being coupled to said upper portion;

a key retaining means for retaining said key in said key slot; and a coin operated means for actuating said key retaining means, said coin operated means being operationally coupled between said coin slot and said key retaining means;

wherein said key from a first rental assembly is insertable in said key slot of a second rental assembly such that said first rental assembly is locked to said second assembly, said coin operated means of said second rental assembly being adapted to actuate said key retaining means of said second rental assembly to release said key of said first rental assembly, said key retaining means of said second rental means being adapted to actuate said coin operated means of said second rental assembly upon insertion of said key of said first rental assembly into said key slot of said second rental assembly;

wherein said upper portion has a bottom with an arcuate channel adapted for receiving a portion of the handle of a shopping cart; and wherein said arcuate channel of said upper portion has an elastomeric layer for resisting rotation of said upper portion around the handle of the shopping cart.

2. The cart rental system as set forth in claim 1, wherein said lower portion has a top with an arcuate channel adapted for receiving a portion of the handle of a shopping cart.

3. The cart rental system as set forth in claim 2, wherein said arcuate channel of said lower portion has an elastomeric layer for resisting rotation of said lower portion around the handle of the shopping cart.

4. The cart rental system as set forth in claim 1, wherein each of said coin slots has an elastomeric liner for preventing unassisted removal of the coins from said coins slots.

5. The cart rental system as set forth in claim 1, wherein said key is coupled to said front face of said upper portion by a chain, said chain having a length for preventing said key of one of said rental assemblies from being inserted into said key slot of same said rental assembly.

6. A shopping cart rental system for attaching to handles of shopping carts so as to provide a receptacle for coins received for rental of the cart, the cart rental system comprising:

a plurality of rental assemblies, each of said rental assemblies comprising:

a housing for attaching to the handle of the shopping cart, said housing having an upper portion adapted for orientating above the handle of the shopping cart, said upper portion having a bottom face, said bottom face having an arcuate channel adapted for receiving a portion of the handle of the shopping cart;

wherein said arcuate channel of said upper portion has an elastomeric layer for resisting rotation of said upper portion around the handle of the shopping cart;

a lower portion being couplable to said upper portion for orientating below the handle of the shopping cart, said lower portion has a top face, said top face having an arcuate channel adapted for receiving a portion of the handle of a shopping cart;

wherein said arcuate channel of said lower portion has an elastomeric layer for resisting rotation of said lower portion around the handle of the shopping cart;

a plurality of coin slots being located on a front face of said upper portion, said coin slots being adapted for receiving coins for renting the shopping cart, each of said coin slots having an elastomeric liner for preventing unauthorized removal of the coins from said coins slots;

a key slot being formed through a rear face of said upper portion;

a key being for inserting into said key slot, said key being coupled to said upper portion;

wherein said key is coupled to said front face of said upper portion by a chain, said chain having a length for preventing said key of one of said rental assemblies from being inserted into said key slot of same said rental assembly;

a key retaining means for retaining said key in said key slot; and a coin operated means for actuating said key retaining means, said coin operated means being operationally coupled between said coin slot and said key retaining means;

wherein said key from a first rental assembly is insertable in said key slot of a second rental assembly such that said first rental assembly is locked to said second assembly, said coin operated means of said second rental assembly being adapted to actuate said key retaining means of said second rental assembly to release said key of said first rental assembly, said key retaining means of said second rental means being adapted to actuate said coin operated means of said second rental assembly upon insertion of said key of said first rental assembly into said key slot of said second rental assembly.

7. A shopping cart rental system for attaching to handles of shopping carts so as to provide a receptacle for coins received for rental of the cart, the cart rental system comprising:

a plurality of rental assemblies, each of said rental assemblies comprising:

a housing for attaching to the handle of the shopping cart, said housing having an upper portion adapted for orientating above the handle of the shopping cart;

a lower portion being couplable to said upper portion for orientating below the handle of the shopping cart;

a plurality of coin slots being located on said upper portion, said coin slots being adapted for receiving coins for renting the shopping cart;

a key slot being formed in said upper portion;

a key being for inserting into said key slot, said key being coupled to said upper portion;

a key retaining means for retaining said key in said key slot; and a coin operated means for actuating said key retaining means, said coin operated means being operationally coupled between said coin slot and said key retaining means;

wherein said key from a first rental assembly is insertable in said key slot of a second rental assembly such that said first rental assembly is locked to said second assembly, said coin operated means of said second rental assembly being adapted to actuate said key retaining means of said second rental assembly to release said key of said first rental assembly, said key retaining means of said second rental means being adapted to actuate said coin operated means of said second rental assembly upon insertion of said key of said first rental assembly into said key slot of said second rental assembly;

wherein said lower portion has a top with an arcuate channel adapted for receiving a portion of the handle of a shopping cart; and wherein said arcuate channel of said lower portion has an elastomeric layer for resisting rotation of said lower portion around the handle of the shopping cart.

8. The cart rental system as set forth in claim 7, wherein each of said coin slots has an elastomeric liner for preventing unassisted removal of the coins from said coins slots.

9. The cart rental system as set forth in claim 7, wherein said key is coupled to said upper portion by a chain, said chain having a length for preventing said key of one of said rental assemblies from being inserted into said key slot of same said rental assembly.

* * * * *